US010071757B1

(12) United States Patent
Cheatham et al.

(10) Patent No.: US 10,071,757 B1
(45) Date of Patent: Sep. 11, 2018

(54) CARGO TRAILER SYSTEM

(71) Applicants: Brad Cheatham, Hartselle, AL (US); Jeffrey Cheatham, Hartselle, AL (US)

(72) Inventors: Brad Cheatham, Hartselle, AL (US); Jeffrey Cheatham, Hartselle, AL (US)

( * ) Notice: Subject to any disclaimer, the term of this patent is extended or adjusted under 35 U.S.C. 154(b) by 0 days.

(21) Appl. No.: 15/584,111

(22) Filed: May 2, 2017

(51) Int. Cl.
B62B 3/02 (2006.01)
B60R 9/06 (2006.01)
B62B 3/00 (2006.01)

(52) U.S. Cl.
CPC ............ B62B 3/02 (2013.01); B60R 9/06 (2013.01); B62B 3/007 (2013.01); B62B 2205/12 (2013.01); B62B 2206/006 (2013.01)

(58) Field of Classification Search
CPC ....... B62B 3/02; B62B 3/007; B62B 2205/12; B62B 2206/006; B60R 9/06
USPC .......................................................... 280/30
See application file for complete search history.

(56) References Cited

U.S. PATENT DOCUMENTS

| 2,539,972 | A |   | 1/1951  | Purdy |             |
|-----------|---|---|---------|-------|-------------|
| 3,236,539 | A | * | 2/1966  | Ketterer | B62B 3/007 |
|           |   |   |         |       | 16/113.1    |
| 4,199,170 | A | * | 4/1980  | Hubner | B62B 3/02  |
|           |   |   |         |       | 280/641     |
| 4,468,046 | A |   | 8/1984  | Rutherford |       |
| 5,366,338 | A |   | 11/1994 | Mortensen |        |
| 5,424,715 | A |   | 6/1995  | Lietzow |          |
| 5,649,718 | A |   | 7/1997  | Groglio |          |
| 5,857,695 | A | * | 1/1999  | Crowell | B62B 3/007 |
|           |   |   |         |       | 280/30      |
| 6,579,055 | B1 |  | 6/2003  | Williams |         |
| 6,805,269 | B2 | * | 10/2004 | Lockard | A45F 4/02  |
|           |   |   |         |       | 224/153     |
| 6,846,017 | B2 | * | 1/2005  | Martin | B60R 9/06   |
|           |   |   |         |       | 224/524     |
| 7,066,485 | B2 |  | 6/2006  | Shapiro |          |
| 7,380,803 | B2 | * | 6/2008  | Thomas | B60R 9/06  |
|           |   |   |         |       | 224/519     |
| 7,441,783 | B2 | * | 10/2008 | Clark | B62B 3/001  |
|           |   |   |         |       | 280/30      |
| 7,462,009 | B2 | * | 12/2008 | Hartmann | B62B 5/049 |
|           |   |   |         |       | 280/47.371  |
| 7,905,508 | B2 | * | 3/2011  | Crawford | B60D 1/00 |
|           |   |   |         |       | 224/519     |
| 8,091,916 | B2 | * | 1/2012  | Shapiro | B62B 3/007 |
|           |   |   |         |       | 280/47.18   |
| 8,465,031 | B2 | * | 6/2013  | Coghill, Jr. | B62B 1/14 |
|           |   |   |         |       | 280/47.35   |
| 8,505,932 | B1 | * | 8/2013  | Piccirillo | B62B 5/0003 |
|           |   |   |         |       | 280/30      |

(Continued)

FOREIGN PATENT DOCUMENTS

WO    WO2003101802    12/2003

Primary Examiner — James A Shriver, II
Assistant Examiner — Brian L Cassidy

(57) ABSTRACT

A cargo trailer system includes a vehicle has a hitch receiver. A trailer is provided and the trailer may be manipulated thereby facilitating the trailer to be urged along a support surface. The trailer may contain cargo thereby facilitating the cargo to be transported. A plurality of wheels is hingedly coupled to the trailer. The plurality of wheels is selectively positioned between a deployed position and a stored position. The trailer is coupled to the hitch receiver when the wheels are positioned in the stored position. Thus, the vehicle carries the trailer.

12 Claims, 3 Drawing Sheets

(56) References Cited

U.S. PATENT DOCUMENTS

| | | | |
|---|---|---|---|
| 8,733,766 B2 * | 5/2014 | Nieman | A45C 13/385 280/30 |
| 8,746,377 B1 * | 6/2014 | Dunbar | B62B 5/0003 180/19.2 |
| 9,216,698 B2 * | 12/2015 | Rhodes | B60R 9/065 |
| D751,469 S * | 3/2016 | Rackleff | D12/162 |
| D751,952 S * | 3/2016 | Rackleff | D12/162 |
| 9,327,749 B2 * | 5/2016 | Young | B62B 3/02 |
| 9,365,225 B2 * | 6/2016 | Henao | B62B 3/02 |
| D772,764 S * | 11/2016 | Thurber | D12/162 |
| 9,487,225 B1 * | 11/2016 | Looman | B62B 13/06 |
| 9,616,820 B2 * | 4/2017 | Raley | B60R 3/00 |
| 9,663,039 B2 * | 5/2017 | Marmon | B60D 1/58 |
| 9,738,230 B2 * | 8/2017 | Bohmer | B60R 9/06 |
| 9,771,093 B2 * | 9/2017 | Horowitz | B62B 3/025 |
| 2002/0140190 A1 * | 10/2002 | Shapiro | B62B 1/206 280/39 |
| 2004/0173654 A1 * | 9/2004 | McAlister | B60D 1/52 224/519 |
| 2006/0062657 A1 | 3/2006 | Davis et al. | |
| 2006/0118586 A1 * | 6/2006 | Heravi | B60R 9/0426 224/519 |
| 2006/0145461 A1 * | 7/2006 | Anderson | B60R 9/06 280/769 |
| 2009/0146394 A1 * | 6/2009 | Seivert | B60R 9/06 280/504 |
| 2009/0152314 A1 * | 6/2009 | Myrex | B60R 9/06 224/502 |
| 2009/0159627 A1 * | 6/2009 | Myrex | B60R 9/06 224/495 |
| 2010/0059950 A1 * | 3/2010 | Coghill, Jr. | B62B 1/14 280/47.26 |
| 2010/0102524 A1 * | 4/2010 | Larsen | B62B 3/007 280/35 |
| 2015/0367785 A1 * | 12/2015 | Sanders | B60R 9/06 224/519 |

\* cited by examiner

CARGO TRAILER SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to trailer devices and more particularly pertains to a new trailer device for facilitating a trailer to be selectively supported on a vehicle.

BRIEF SUMMARY OF THE INVENTION

An embodiment of the disclosure meets the needs presented above by generally comprising a vehicle has a hitch receiver. A trailer is provided and the trailer may be manipulated thereby facilitating the trailer to be urged along a support surface. The trailer may contain cargo thereby facilitating the cargo to be transported. A plurality of wheels is hingedly coupled to the trailer. The plurality of wheels is selectively positioned between a deployed position and a stored position. The trailer is coupled to the hitch receiver when the wheels are positioned in the stored position. Thus, the vehicle carries the trailer.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
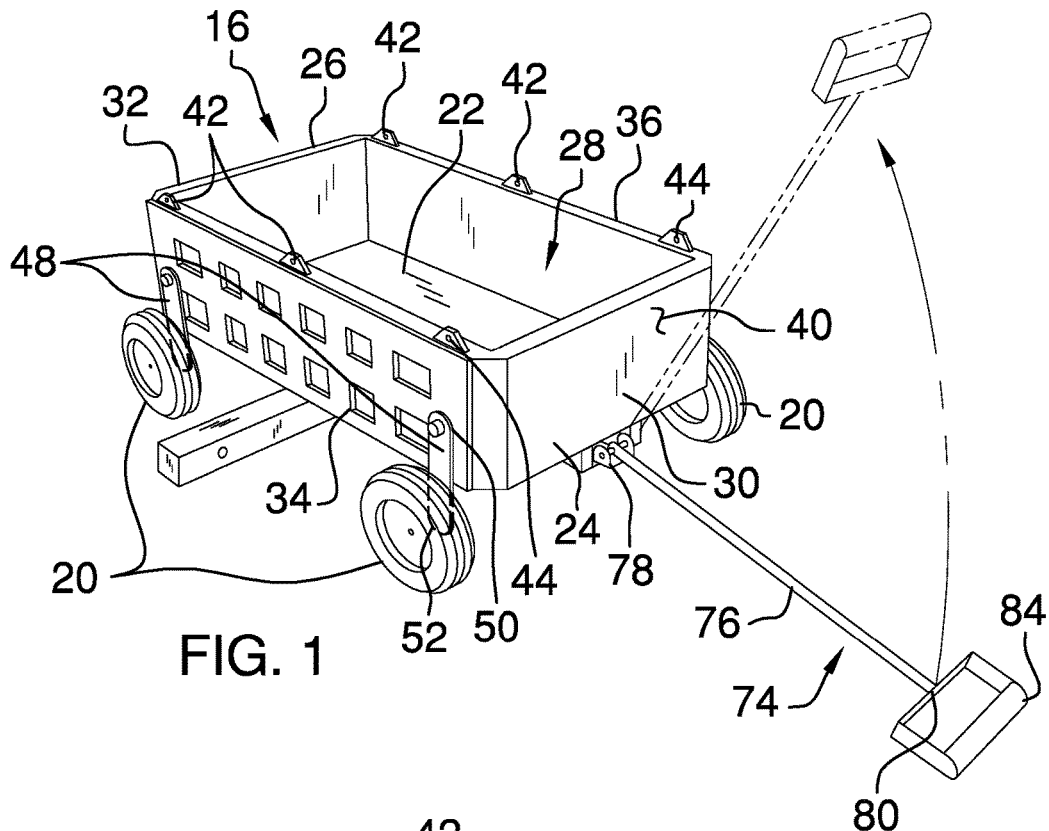
FIG. 1 is a front perspective view of a trailer of a cargo trailer system according to an embodiment of the disclosure.
Figure 2:
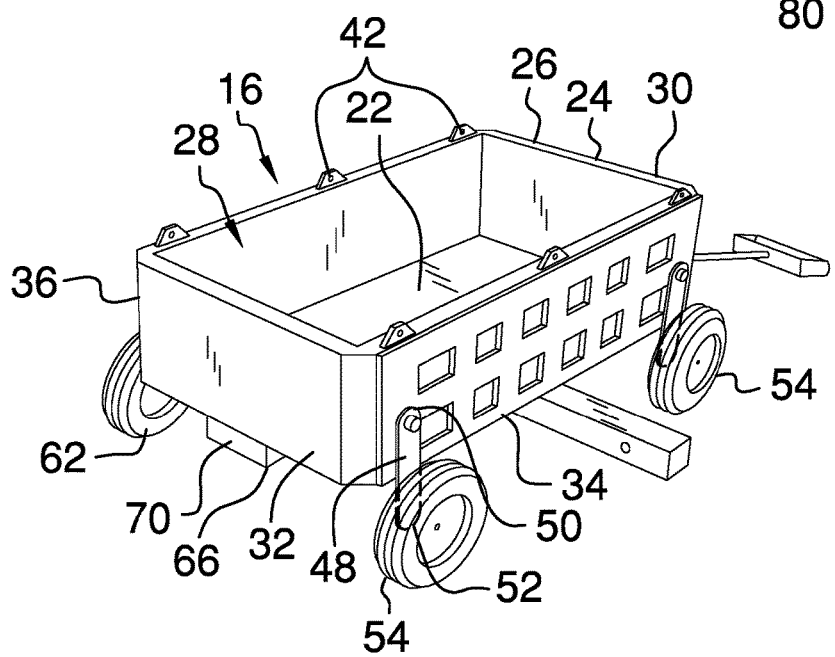
FIG. 2 is a back perspective view of a trailer of an embodiment of the disclosure.
Figure 3:
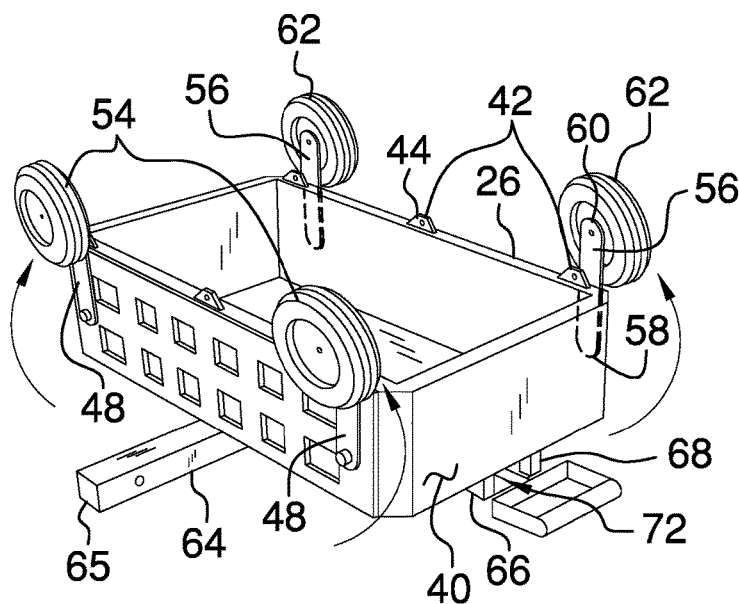
FIG. 3 is a perspective view of trailer of an embodiment of the disclosure in a stored position.
Figure 4:
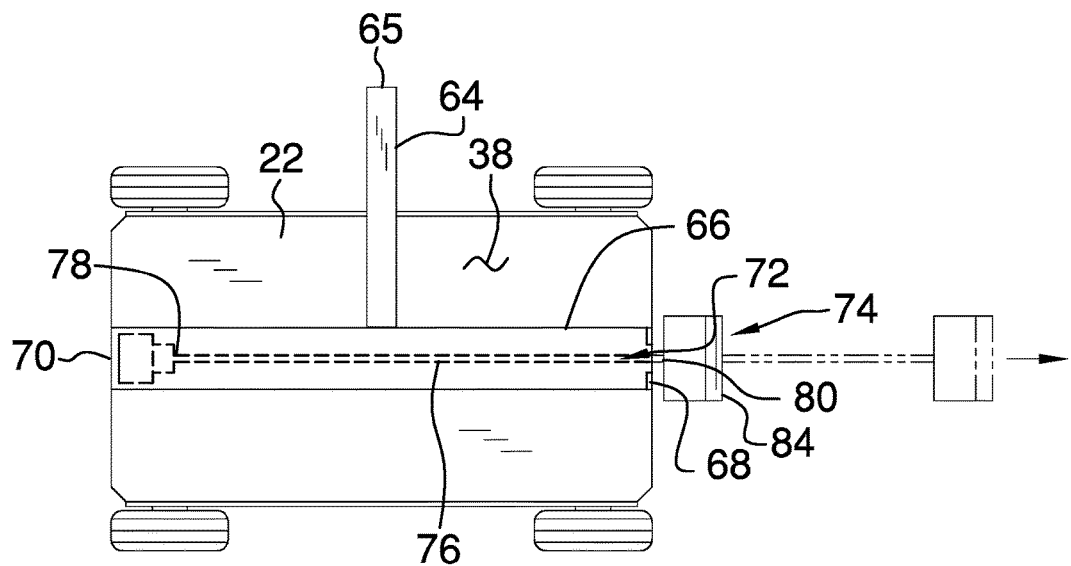
FIG. 4 is a bottom phantom view of trailer of an embodiment of the disclosure.
Figure 5:
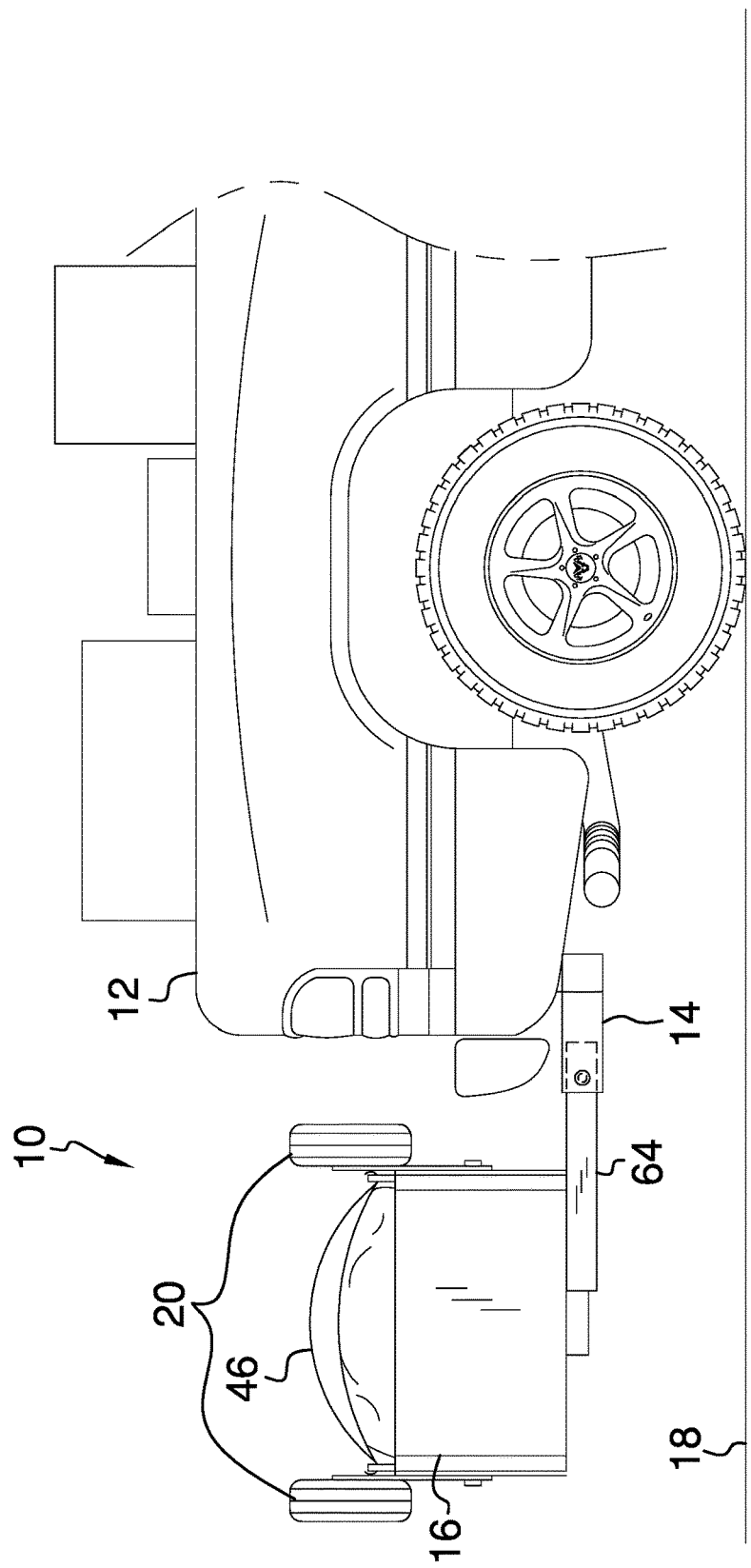
FIG. 5 is a perspective view of an embodiment of the disclosure.

With reference now to the drawings, and in particular to FIGS. 1 through 5 thereof, a new trailer device embodying the principles and concepts of an embodiment of the disclosure and generally designated by the reference numeral 10 will be described.

As best illustrated in FIGS. 1 through 5, the cargo trailer system 10 generally comprises a vehicle 12 that has a hitch receiver 14. The vehicle 12 may be a pickup or the like. A trailer 16 is provided. The trailer 16 may be manipulated thereby facilitating the trailer 16 to be urged along a support surface 18. The support surface 18 may be ground. The trailer 16 may contain cargo thereby facilitating the cargo to be transported.

A plurality of wheels 20 is hingedly coupled to the trailer 16. The wheels 20 are selectively positioned between a deployed position and a stored position. The trailer 16 is coupled to the hitch receiver 14 when the wheels 20 are positioned in the stored position. Thus, the vehicle 12 supports an entire weight of the trailer 16.

The trailer 16 comprises a bottom wall 22 and a peripheral wall 24 extending upwardly therefrom. The peripheral wall 24 has a distal edge 26 with respect to the bottom wall 22. The distal edge 26 defines an opening 28 into the trailer 16 to receive the cargo. The peripheral wall 24 has a front side 30, a back side 32, a first lateral side 34 and a second lateral side 36. The bottom wall 22 has a lower surface 38 and the peripheral wall 24 has an outer surface 40.

A plurality of tabs 42 is provided and each of the tabs 42 is coupled to and extends upwardly from the distal edge 26. The tabs 42 are spaced apart from each other and are distributed around the distal edge 26. Each of the tabs 42 has an opening 44 extending therethrough. A tarp 46 may be coupled to the opening 44 in each of the tabs 42 to cover the cargo in the trailer 16.

A set of first stands 48 is provided. Each of the first stands 48 has a first end 50 and a second end 52. The first end 50 corresponding to each of the first stands 48 is hingedly coupled to the first lateral side 34 of the trailer 16. The first stands 48 are spaced apart from each other.

Each of the first stands 48 is selectively positioned in a deployed position. Thus, the second end 52 of each of the first stands 48 is spaced from the bottom wall 22. Each of the first stands 48 is positioned in a stored position. Thus, the second end 52 of each of the first stands 48 is spaced from the distal edge 26 of the trailer 16.

The plurality of wheels 20 includes a set of first wheels 54. Each of the first wheels 54 is rotatably coupled to the second end 52 of an associated one of the first stands 48. Each of the first wheels 54 is spaced from the bottom wall 22 when the first stands 48 are in the deployed position. Thus, each of the first wheels 54 may roll along the support surface 18. Each of the first wheels 54 are spaced from the distal edge 26 of the peripheral wall 24 when the first stands 48 are in the stored position. Moreover, each of the first wheels 54 is rotatable about an axis extending through the first 50 and second 52 ends of the associated first stand 48 for steering the trailer 16. A first axle may extend between each of the first wheels 54.

A set of second stands 56 is provided. Each of the second stands 56 has a primary end 58 and a secondary end 60. The second end 52 corresponding to each of the second stands 56 is hingedly coupled to the second lateral side 36 of the trailer 16. The second stands 56 are spaced apart from each other.

Each of the second stands 56 is selectively positioned in a deployed position. Thus, the secondary end 60 of each of the second stands 56 is spaced from the bottom wall 22. Each of the second stands 56 is positioned in a stored position. Thus, the secondary end 60 of each of the second stands 56 is spaced from the distal edge 26 of the trailer 16.

The plurality of wheels 20 includes a set of second wheels 62. Each of the second wheels 62 is rotatably coupled to the secondary end 60 of an associated one of the second stands 56. Each of the second wheels 62 is spaced from the bottom wall 22 when the second stands 56 are in the deployed position. Thus, each of the second wheels 62 may roll along the support surface 18. Each of the second wheels 62 is spaced from the distal edge 26 of the peripheral wall 24 when the second stands 56 are in the stored position. A second axle may extend between each of the second wheels 62.

A hitch 64 is coupled to the lower surface 38 of the bottom wall 22. The hitch 64 has a distal end 65 with respect to the first lateral side 34 of the trailer 16. The hitch 64 is inserted into the hitch receiver 14 such that the trailer 16 is coupled to the vehicle 12. Each of the first stands 48 and the second stands 56 are positioned in the stored position when the hitch 64 is coupled to the hitch receiver 14. Thus, the hitch receiver 14 supports the trailer 16. The hitch 64 may include a pair of lateral supports and each of the lateral supports may angle between the hitch and the lower surface of the bottom wall 22. In this way the lateral supports may inhibit the hitch from deflecting laterally.

A channel 66 is coupled to the lower surface 38 of the bottom wall 22. The channel 66 has a front end 68 and a back end 70. The front end 68 has an opening 72 extending into an interior of the channel 66. The channel 66 extends between the front side 30 and the back side 32 of the trailer 16.

A handle 74 is slidably positioned in the channel 66. The handle 74 is selectively positioned between an extended position. Thus, the handle 74 may be manipulated thereby facilitating the trailer 16 to be urged along the support surface 18. The handle 74 is selectively positioned in a retracted position. The handle 74 comprises a rod 76 that has a first end 78 and a second end 80. The rod 76 is slidably positioned in the channel 66. The rod 76 extends outwardly from the front end 68 of the channel 66 when the handle 74 is positioned in the extended position.

A stop 82 is hingedly coupled to the first end 78 of the rod 76. The stop 82 is slidably positioned in the channel 66. The stop 82 engages the front end 68 of the channel 66 when the handle 74 is positioned in the extended position. Thus, the stop 82 inhibits the handle 74 from being removed from the channel 66. A grip 84 is coupled to the second end 80 of the handle 74. The grip 84 may be gripped when the handle 74 is positioned in the extended position.

In use, the hitch 64 is coupled to the hitch receiver 14 on the vehicle 12. The handle 74 is positioned in the retracted position. Each of the first stands 48 and the second stands 56 are positioned in the stored position. Thus, the hitch supports the entire weight of the trailer 16 and the vehicle 12 is driven.

Each of the first stands 48 and the second stands 56 are positioned in the deployed position. The hitch is removed from the hitch receiver 14. Thus, the wheels 20 abut the support surface 18. The handle 74 is positioned in the extended position and the trailer 16 is urged along the support surface 18.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A cargo trailer system comprising:

a vehicle having a hitch receiver; and a trailer being configured to be manipulated thereby facilitating said trailer to be urged along a support surface, said trailer being configured to contain cargo thereby facilitating said cargo to be transported, said trailer having a plurality of wheels being hingedly coupled thereto, said plurality of wheels being selectively positioned between a deployed position and a stored position, said trailer being coupled to said hitch receiver when said wheels are positioned in said stored position such that said vehicle carries said trailer, said trailer having a bottom wall and a peripheral wall extending upwardly therefrom, said peripheral wall having a distal edge with respect to said bottom wall, said distal edge defining an opening into said trailer wherein said opening is configured to receive the cargo, said peripheral wall having a front side, a back side, a first lateral side and a second lateral side, said bottom wall having a lower surface, said peripheral wall having an outer surface; and a set of first stands, each of said first stands having a first end and a second end, said first end corresponding to each of said first stands being hingedly coupled to said first lateral side of said trailer, said first stands being spaced apart from each other, each of said first stands being selectively positioned in a deployed position having said second end of each of said first stands being spaced from said bottom wall, each of said first stands being positioned in a stored position having each of said second end of each of said first stands being spaced from said distal edge of said trailer.

2. The system according to claim 1, further comprising a plurality of tabs, each of said tabs being coupled to and extending upwardly from said distal edge, said tabs being spaced apart from each other and being distributed around said distal edge, each of said tabs having an opening extending therethrough wherein said opening in each of said tabs is configured to have a tarp coupled thereto thereby facilitating the tarp to cover the cargo in said trailer.

3. The system according to claim 1, wherein said plurality of wheels includes a set of first wheels, each of said first wheels being rotatably coupled to said second end of an associated one of said first stands, each of said first wheels being spaced from said bottom wall when said first stands are in said deployed position wherein each of said first wheels is configured to roll along the support surface, each of said first wheels being spaced from said distal edge of said peripheral wall when said first stands are in said stored position.

4. The system according to claim 1, further comprising a set of second stands, each of said second stands having a primary end and a secondary end, said second end corresponding to each of said second stands being hingedly coupled to said second lateral side of said trailer, said second stands being spaced apart from each other, each of said second stands being selectively positioned in a deployed position having said secondary end of each of said second stands being spaced from said bottom wall, each of said second stands being positioned in a stored position having said secondary end of each of said second stands being spaced from said distal edge of said trailer.

5. The system according to claim 4, further comprising said plurality of wheels including a set of second wheels, each of said second wheels being rotatably coupled to said secondary end of an associated one of said second stands, each of said second wheels being spaced from said bottom wall when said second stands are in said deployed position wherein each of said second wheels is configured to roll along the support surface, each of said second wheels being spaced from said distal edge of said peripheral wall when said second stands are in said stored position.

6. The system according to claim 1, further comprising:
a set of second stands; and
a hitch being coupled to said lower surface of said bottom wall, said hitch having a distal end with respect to said first lateral side of said trailer, said hitch being inserted into said hitch receiver such that said trailer is coupled to said vehicle, each of said first stands and said second stands being positioned in a stored position when said hitch is coupled to said hitch receiver such that said hitch receiver supports said trailer.

7. The system according to claim 1, further comprising a channel being coupled to said lower surface of said bottom wall, said channel having a front end and a back end, said front end having an opening extending into an interior of said channel, said channel extending between said front side and said back side of said trailer.

8. A cargo trailer system comprising:
a vehicle having a hitch receiver;
a trailer being configured to be manipulated thereby facilitating said trailer to be urged along a support surface, said trailer being configured to contain cargo thereby facilitating said cargo to be transported, said trailer having a plurality of wheels being hingedly coupled thereto, said plurality of wheels being selectively positioned between a deployed position and a stored position, said trailer being coupled to said hitch receiver when said wheels are positioned in said stored position such that said vehicle carries said trailer, said trailer having a bottom wall and a peripheral wall extending upwardly therefrom, said peripheral wall having a distal edge with respect to said bottom wall, said distal edge defining an opening into said trailer wherein said opening is configured to receive the cargo, said peripheral wall having a front side, a back side, a first lateral side and a second lateral side, said bottom wall having a lower surface, said peripheral wall having an outer surface;
a channel being coupled to said lower surface of said bottom wall, said channel having a front end and a back end, said front end having an opening extending into an interior of said channel, said channel extending between said front side and said back side of said trailer; and
a handle being slidably positioned in said channel, said handle being selectively positioned between an extended position wherein said handle is configured to be manipulated thereby facilitating said trailer to be urged along the support surface, said handle being selectively positioned in a retracted position.

9. The system according to claim 8, wherein said handle comprises a rod having a first end and a second end, said rod being slidably positioned in said channel, said rod extending outwardly from said front end of said channel when said handle is positioned in said extended position.

10. The system according to claim 9, further comprising a stop being hingedly coupled to said first end of said rod, said stop being slidably positioned in said channel, said stop engaging said front end of said channel when said handle is positioned in said extended position such that said stop inhibits said handle from being removed from said channel.

11. The system according to claim 9, further comprising a grip being coupled to said second end of said handle wherein said grip is configured to be gripped when said handle is positioned in said extended position.

12. A cargo trailer system comprising:
a vehicle having a hitch receiver; and
a trailer being configured to be manipulated thereby facilitating said trailer to be urged along a support surface, said trailer being configured to contain cargo thereby facilitating said cargo to be transported, said trailer having a plurality of wheels being hingedly coupled thereto, said plurality of wheels being selectively positioned between a deployed position and a stored position, said trailer being coupled to said hitch receiver when said wheels are positioned in said stored position such that said vehicle carries said trailer, said trailer comprising:
a bottom wall and a peripheral wall extending upwardly therefrom, said peripheral wall having a distal edge with respect to said bottom wall, said distal edge defining an opening into said trailer wherein said opening is configured to receive the cargo, said peripheral wall having a front side, a back side, a first lateral side and a second lateral side, said bottom wall having a lower surface, said peripheral wall having an outer surface,
a plurality of tabs, each of said tabs being coupled to and extending upwardly from said distal edge, said tabs being spaced apart from each other and being distributed around said distal edge, each of said tabs having an opening extending therethrough wherein said opening in each of said tabs is configured to have a tarp coupled thereto thereby facilitating the tarp to cover the cargo in said trailer, a set of first stands, each of said first stands having a first end and a second end, said first end corresponding to each of said first stands being hingedly coupled to said first lateral side of said trailer, said first stands being spaced apart from each other, each of said first stands being selectively positioned in a deployed position having said second end of each of said first stands being spaced from said bottom wall, each of said first stands being positioned in a stored position having said second end of each of said first stands being spaced from said distal edge of said trailer, said plurality of wheels including a set of first wheels, each of said first wheels being rotatably coupled to said second end of an associated one of said first stands, each of said first wheels being spaced from said bottom wall when said first stands are in said deployed position wherein each of said first wheels is configured to roll along the support surface, each of said first wheels being spaced from said distal edge of said peripheral wall when said first stands are in said stored position, a set of second stands, each of said second stands having a primary end and a secondary end, said second end corresponding to each of said second stands being hingedly coupled to said second lateral side of said trailer, said second stands being spaced apart from each other, each of said second stands being selectively positioned in a deployed position having said secondary end of each of said second stands being spaced from said bottom wall, each of said second stands being positioned in a stored position having said secondary end of each of said second stands being spaced from said distal edge of said trailer, said plurality of wheels including a set of second wheels, each of said second wheels being rotatably coupled to said secondary end of an associated one of said second stands, each of said second wheels being spaced from said bottom wall when said second stands are in said deployed position wherein each of said second wheels is configured to roll along the support surface, each of said second wheels being spaced from said distal edge of said peripheral wall when said second stands are in said stored position, a hitch being coupled to said lower surface of said bottom wall, said hitch having a distal end with respect to said first lateral side of said trailer, said hitch being inserted into said hitch receiver such that said trailer is coupled to said vehicle, each of said first stands and said second stands being positioned in said stored position when said hitch is coupled to said hitch receiver such that said hitch receiver supports said trailer, a channel being coupled to said lower surface of said bottom wall, said channel having a front end and a back end, said front end having an opening extending into an interior of said channel, said channel extending between said front side and said back side of said trailer, and a handle being slidably positioned in said channel, said handle being selectively positioned between an extended position wherein said handle is configured to be manipulated thereby facilitating said trailer to be urged along the support surface, said handle being selectively positioned in a retracted position, said handle comprising:

a rod having a first end and a second end, said rod being slidably positioned in said channel, said rod extending outwardly from said front end of said channel when said handle is positioned in said extended position, a stop being hingedly coupled to said first end of said rod, said stop being slidably positioned in said channel, said stop engaging said front end of said channel when said handle is positioned in said extended position such that said stop inhibits said handle from being removed from said channel, and a grip being coupled to said second end of said handle wherein said grip is configured to be gripped when said handle is positioned in said extended position.

* * * * *